(12) United States Patent
Chandrashekar

(10) Patent No.: US 12,507,129 B2
(45) Date of Patent: Dec. 23, 2025

(54) LAYER 1/LAYER 2 TRIGGERED MOBILITY FOR INTRA-BASE STATION CENTRALIZED UNIT USER PLANE RELOCATION

(71) Applicant: Rakuten Symphony, Inc., Tokyo (JP)

(72) Inventor: Subramanya Chandrashekar, Bangalor (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 433 days.

(21) Appl. No.: 18/010,632

(22) PCT Filed: Dec. 8, 2022

(86) PCT No.: PCT/US2022/052262
§ 371 (c)(1),
(2) Date: Dec. 15, 2022

(87) PCT Pub. No.: WO2024/123337
PCT Pub. Date: Jun. 13, 2024

(65) Prior Publication Data
US 2024/0224127 A1 Jul. 4, 2024

(51) Int. Cl.
*H04W 36/00* (2009.01)
*H04W 36/04* (2009.01)

(52) U.S. Cl.
CPC ... *H04W 36/0016* (2013.01); *H04W 36/0033* (2013.01); *H04W 36/0058* (2018.08); *H04W 36/04* (2013.01)

(58) Field of Classification Search
None
See application file for complete search history.

(56) References Cited

U.S. PATENT DOCUMENTS

| | | | | |
|---|---|---|---|---|
| 11,622,300 B2 * | 4/2023 | Byun | ............... | H04W 36/0033 370/331 |
| 2019/0342800 A1 * | 11/2019 | Sirotkin | ............... | H04W 36/02 |
| 2021/0058771 A1 * | 2/2021 | Wu | ............... | H04L 9/0861 |
| 2021/0176802 A1 * | 6/2021 | Sirotkin | ............. | H04W 88/085 |
| 2021/0360439 A1 * | 11/2021 | Akl | .............. | H04W 76/10 |
| 2022/0322177 A1 * | 10/2022 | Damnjanovic | ... | H04W 36/0061 |
| 2023/0037332 A1 * | 2/2023 | Chandrashekar | ..... | H04W 76/19 |

(Continued)

OTHER PUBLICATIONS

International Search Report and Written Opinion for International Patent Application No. PCT/US22/52262 mailed Apr. 5, 2023.

(Continued)

*Primary Examiner* — Eunsook Choi
(74) *Attorney, Agent, or Firm* — Sughrue Mion, PLLC

(57) ABSTRACT

In general, the current subject matter relates to layer 1/layer 2 (L1/L2) triggered mobility (LTM) for intra-base station centralized unit user plane (CU-UP) relocation. In some implementations, a target distributed unit (DU) of a base station to serve a user equipment (UE) can be determined to be served by a target CU-UP of the base station. A serving CU-UP of the base station can serve a serving DU of the base station that is currently serving the UE. Using a centralized unit control plane (CU-CP) of the base station, the target CU-UP can be prepared for layer 1/layer 2 triggered mobility (LTM), and, using the CU-CP, the target DU can be prepared for LTM.

20 Claims, 15 Drawing Sheets

(56) References Cited

U.S. PATENT DOCUMENTS

2023/0328604 A1* 10/2023 Teyeb ............... H04W 36/0235
  370/331
2023/0388871 A1* 11/2023 Guo .................. H04W 36/0069
2024/0163749 A1* 5/2024 Gürsu .................. H04W 16/28
2024/0163750 A1* 5/2024 Purkayastha ... H04W 36/00837

OTHER PUBLICATIONS

3GPP TR 38.806, 3rd Generation Partnership Project, Technical Specification Group Radio Access Network, Study of separation of NR Control Plane (CP) and User Plane (UP) for split option 2 (Release 15), Dec. 2017.

3GPP TS 38.321, 3rd Generation Partnership Project, Technical Specification Group Radio Access Network, NR, Medium Access Control (MAC) protocol specification (Release 17), Sep. 2022.

3GPP TS 38.331, 3rd Generation Partnership Project, Technical Specification Group Radio Access Network, NR, Radio Resource Control (RRC) protocol specification (Release 17), Sep. 2022.

3GPP TS 38.463, 3rd Generation Partnership Project, Technical Specification Group Radio Access Network, NG-RAN, E1 Application Protocol (E1AP) (Release 17), Apr. 2022.

3GPP TS 38.473, 3rd Generation Partnership Project, Technical Specification Group Radio Access Network, NG-RAN, F1 Application Protocol (F1AP) (Release 17), Sep. 2022.

MediaTek Inc., RP-221799 (was RP-221558), "Revised WID on Further NR mobility enhancements," 3GPP TSG RAN Meeting #96, Electronic Meeting, Jun. 6-9, 2022.

MediaTek, RP-213565, "New WID on Further NR mobility enhancements," 3GPP TSG RAN Meeting #94e, Electronic Meeting, Dec. 6-17, 2021.

Techplayon, "5G SA Handover—Inter gNB-DU and Intra gNB-CU Handover," May 11, 2021, available at <https://www.techplayon.com/5g-sa-handover-inter-gnb-du-and-intra-gnb-cu-handover/>.

\* cited by examiner

LAYER 1/LAYER 2 TRIGGERED MOBILITY FOR INTRA-BASE STATION CENTRALIZED UNIT USER PLANE RELOCATION

CROSS-REFERENCE TO RELATED APPLICATIONS

The present application claims priority to and is the 35 U.S.C. 371 United States National Phase application based on International Patent Application No. PCT/US22/52262, filed on Dec. 8, 2022, entitled "LAYER 1/LAYER 2 TRIGGERED MOBILITY FOR INTRA-BASE STATION CENTRALIZED UNIT USER PLANE RELOCATION," which is hereby incorporated by reference in its entirety.

TECHNICAL FIELD

In some implementations, the current subject matter relates to telecommunications systems, and in particular, to layer 1/layer 2 triggered mobility (LTM) for intra-base station centralized unit user plane (CU-UP) relocation.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile: in rural areas, the range can be as much as 5 miles: and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

A base station for a 5G cellular network can include a centralized unit (CU), one or more distributed units (DUs) communicatively coupled to the CU, and one or more radio units (RUS) each communicatively coupled to at least one of the one or more DUs and each configured to be communicatively coupled to one or more mobile phones and/or other user equipments (UEs). The CU can be logically split into a control plane portion CU-CP and one or more user plane portions (CU-UP). In a disaggregated architecture the base station includes more than one CU-UP. During the course of a UE's communicative coupling with the base station, the CU-UP of the base station providing support to the UE may change from one CU-UP of the base station to another CU-UP of the base station. However, cell service changes per current standards are triggered by layer 3 (L3) measurements and thus require resets at lower layers layer 1 (L1) and layer 2 (L2), which leads to longer latency, larger overhead, and longer interruption time.

SUMMARY

In some implementations, the current subject matter relates to a computer-implemented method. The method can include determining that a target distributed unit (DU) of a base station to serve a user equipment (UE) is served by a target centralized unit user plane (CU-UP) of the base station. A serving CU-UP of the base station can serve a serving DU of the base station that is currently serving the UE. The method can also include preparing, using a centralized unit control plane (CU-CP) of the base station, the target CU-UP for layer 1/layer 2 triggered mobility (LTM), and preparing, using the CU-CP, the target DU for LTM.

The method may allow the base station to provide LTM when the UE undergoes relocation from one CU-UP of the base station to another CU-UP of the base station for one or more services.

In some implementations, the current subject matter can include one or more of the following optional features.

In some implementations, preparing the target CU-UP can include fetching, using the CU-CP, a security key from the target CU-UP, and preparing the target DU can include transmitting, from the CU-CP to the target DU, the security key. Further, the security key configured by the target CU-UP can be transmitted from the CU-CP to the target DU in a UE CONTEXT SETUP REQUEST message: and/or fetching the security key can include the CU-CP transmitting a BEARER CONTEXT SETUP REQUEST message to the target CU-UP, and the CU-UP transmitting a BEARER CONTEXT SETUP RESPONSE message to the CU-CP, and the BEARER CONTEXT SETUP RESPONSE message can include the security key, which can correspond to the UE served by the target CU-UP. Further, the BEARER CONTEXT SETUP REQUEST message can include an information element (IE) informing the target CU-UP of the LTM.

In some implementations, preparing the target CU-UP can include transmitting, from the CU-CP to the target CU-UP, an information element (IE) informing the target CU-UP of the LTM to reserve resources for the UE.

In some implementations, the method can also include, after the preparation of the target CU-UP and the preparation of the target DU, triggering the serving CU-UP to begin data forwarding to the target CU-UP. Further, the triggering can include transmitting a control packet data unit (PDU) from the serving DU to the serving CU-UP and, thereafter, the serving CU-UP transmitting unsent and unacknowledged data PDUs to the target CU-UP. Further, the method can also include, prior to the transmission of the control PDU to trigger data forwarding, transmitting, from the CU-CP to the serving DU, information to identify change of the serving CU-UP for LTM. Further, the information can be transmitted from the CU-CP to the serving DU in a UE CONTEXT MODIFICATION REQUEST message.

In some implementations, the method can also include, after the preparation of the target CU-UP and the preparation of the target DU, triggering the target CU-UP to begin serving the UE via the target DU. Further, the triggering can include transmitting a control packet data unit (PDU) from the target DU to the target CU-UP to initiate downlink data transmission and, thereafter, the target CU-UP transmitting data PDUs to the target DU: or the triggering can include transmitting a first message from the serving DU to the CU-CP and, thereafter, the CU-CP transmitting a second message to the serving CU-UP and, thereafter, the serving CU-UP transmitting a third message to the target CU-UP: and/or serving the UE can include transmitting a first message from the target DU to the CU-CP and, thereafter, the CU-CP transmitting a second message to the target CU-UP and, thereafter, the target CU-UP initiating downlink data transmission towards the target DU.

In some implementations, the determining can include analyzing, using the CU-CP, a radio resource control (RRC) measurement report received at the CU-CP from the UE.

In some implementations, the serving CU-UP and the target CU-UP can be different entities.

In some implementations, the base station can be a new generation radio access network (NG-RAN) node.

In some implementations, the base station can include the at least one processor and the at least one non-transitory storage media.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a:

FIG. 1c illustrates additional detail of the evolved packet core of the exemplary LTE system shown in FIG. 1a:

FIG. 1d illustrates an exemplary evolved Node B of the exemplary LTE system shown in FIG. 1a:

DETAILED DESCRIPTION

The current subject matter can provide for systems and methods that can be implemented in wireless communications systems. Such systems can include various wireless communications systems, including 5G New Radio communications systems, long term evolution communication systems, etc.

In general, the current subject matter relates to layer 1 (L1)/layer 2 (L2) triggered mobility (LTM) for intra-base station centralized unit user plane (CU-UP) relocation.

In some implementations of the current subject matter, a base station of a wireless communication system can have a disaggregated architecture in which the base station includes more than one CU-UP. The base station can be configured to provide LTM when a UE communicatively coupled to the base station undergoes relocation from one CU-UP of the base station to another CU-UP of the base station for one or more services of a UE.

3GPP standards defining one or more aspects that may be related to the current subject matter include 3GPP TS 38.321 "NR: Medium Access Control (MAC) protocol specification" 3GPP TS 38.331 "NR: Radio Resource Control (RRC) protocol specification," 3GPP TS 38.463 "NG-RAN: E1 Application Protocol (E1AP)," and 3GPP TS 38.473 "NG-RAN F1 application protocol (F1AP)." Standards of the O-RAN Alliance may also be related to one or more aspects of the current subject matter.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
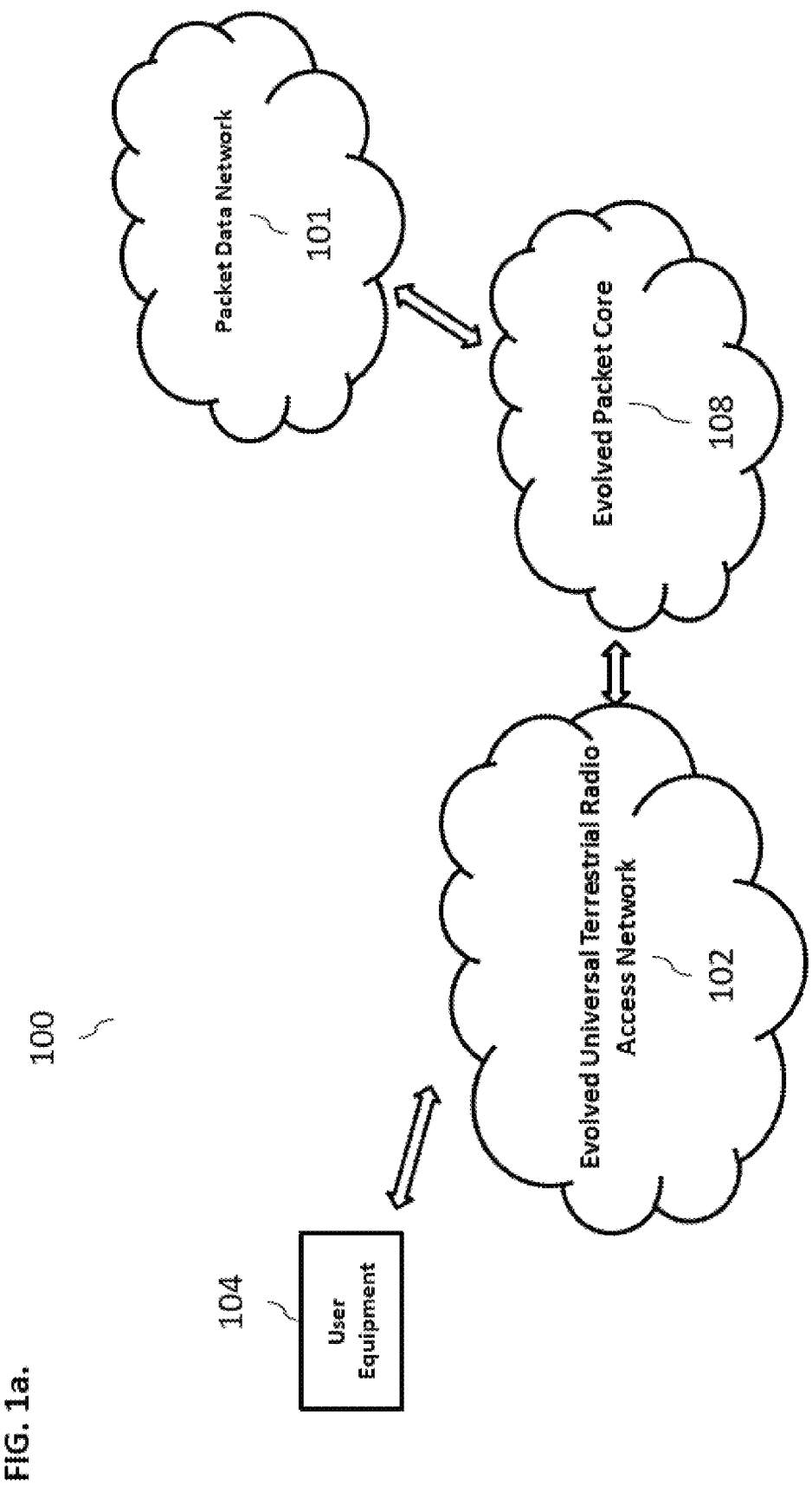
FIG. 1a illustrates an exemplary conventional long term evolution ("LTE") communications system.
Figure 1B:
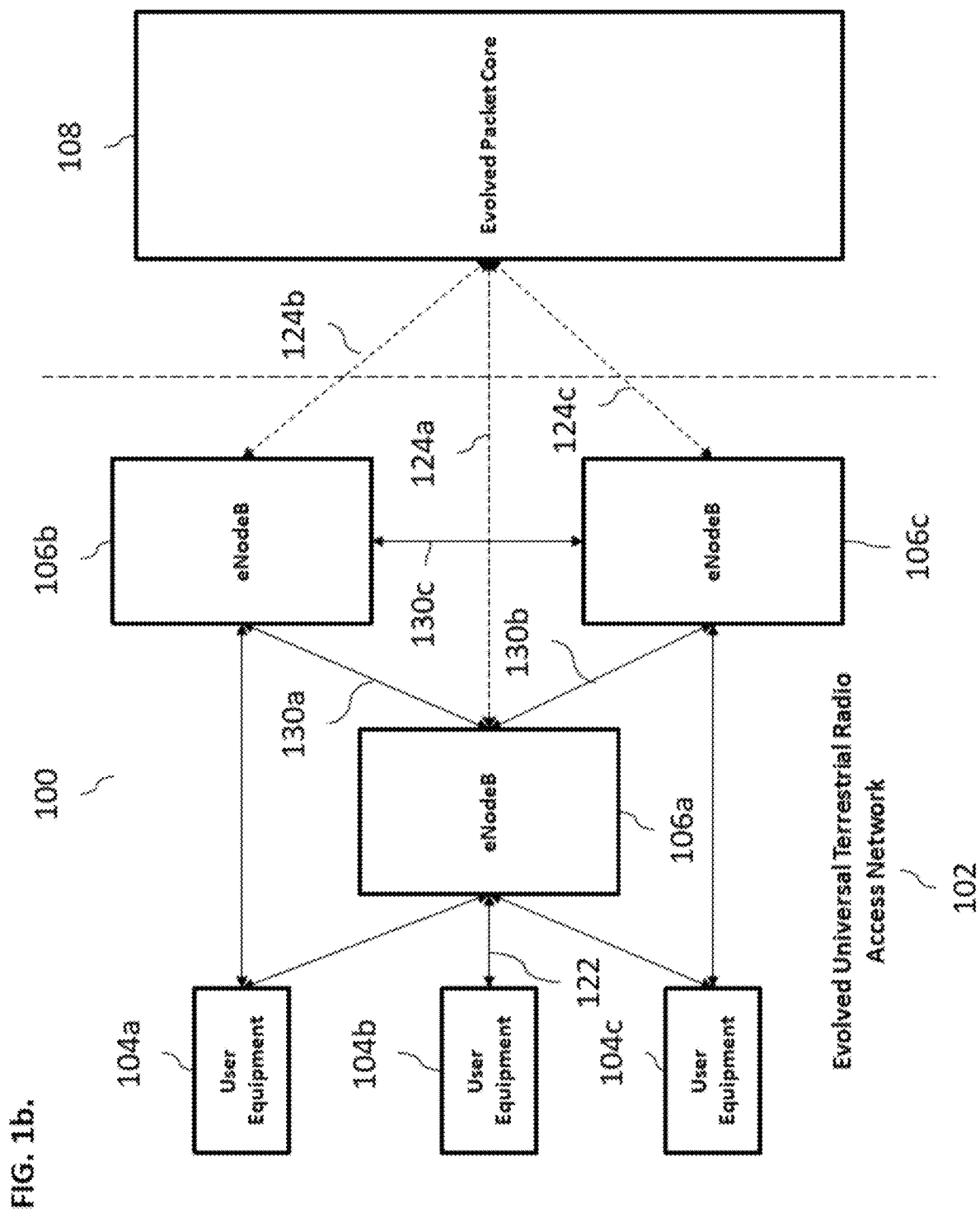

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
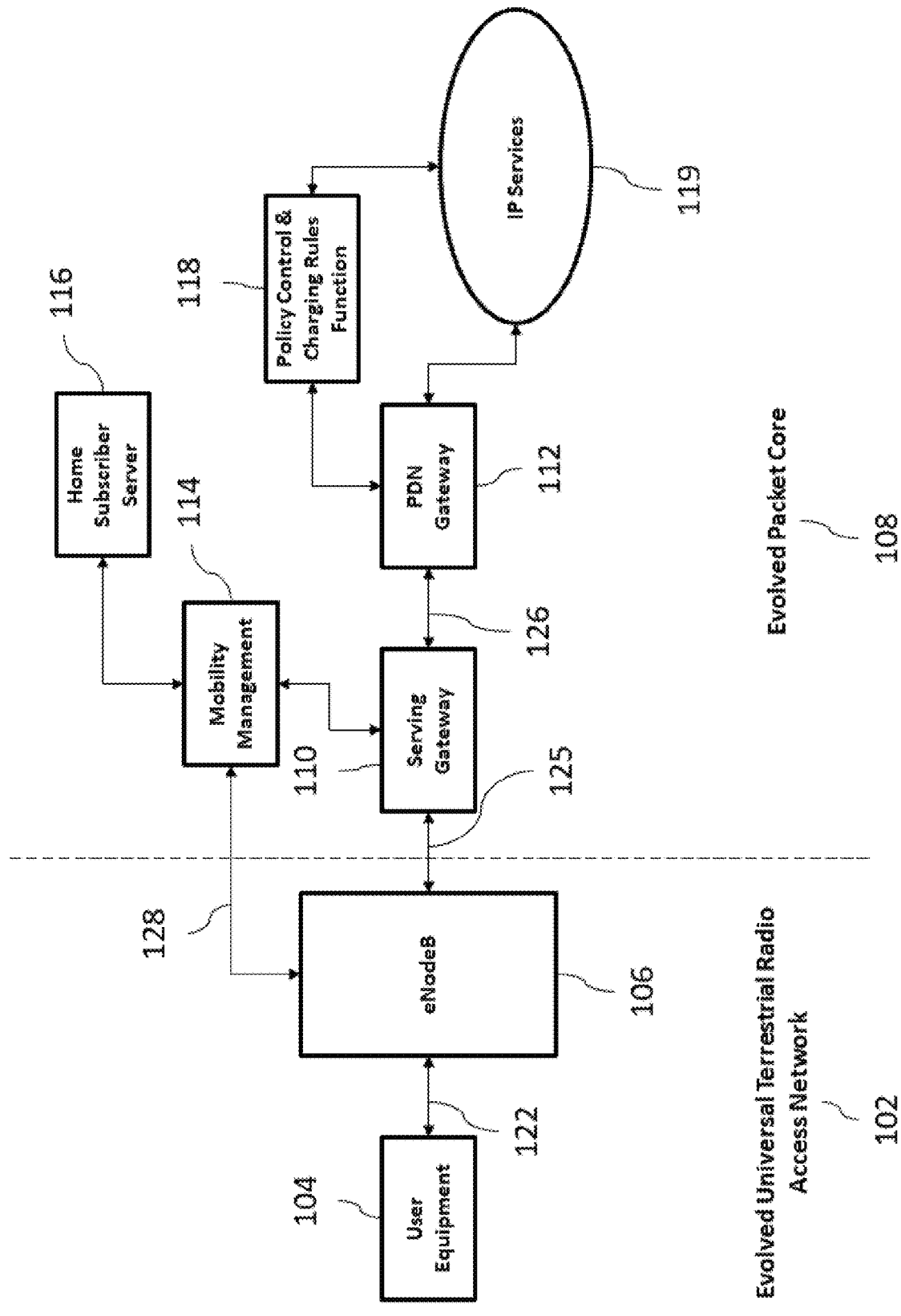

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b: X2 interface 130b provides interconnection between eNodeB 106a and eNodeB 106c: and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108.

Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
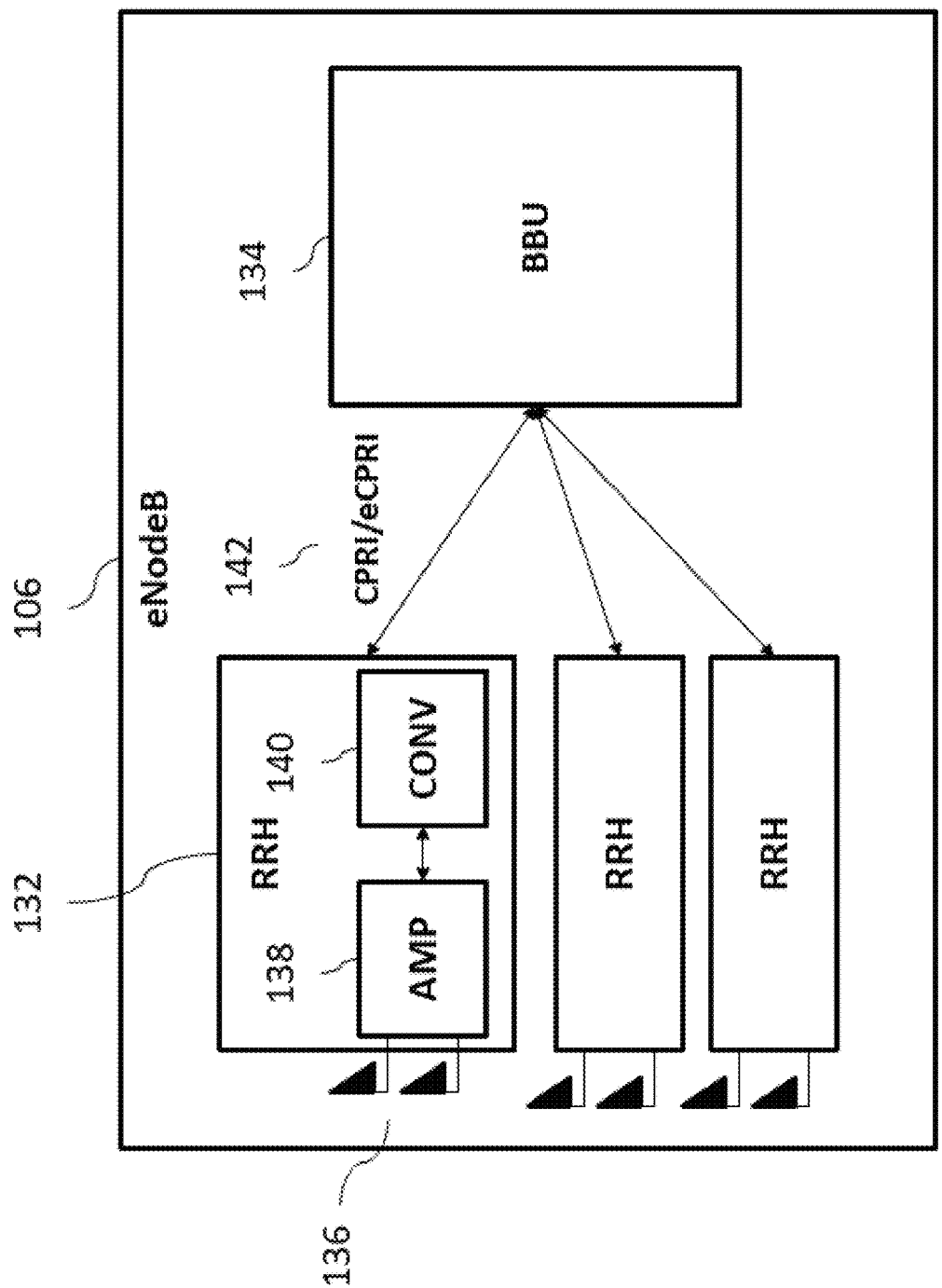

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA: uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
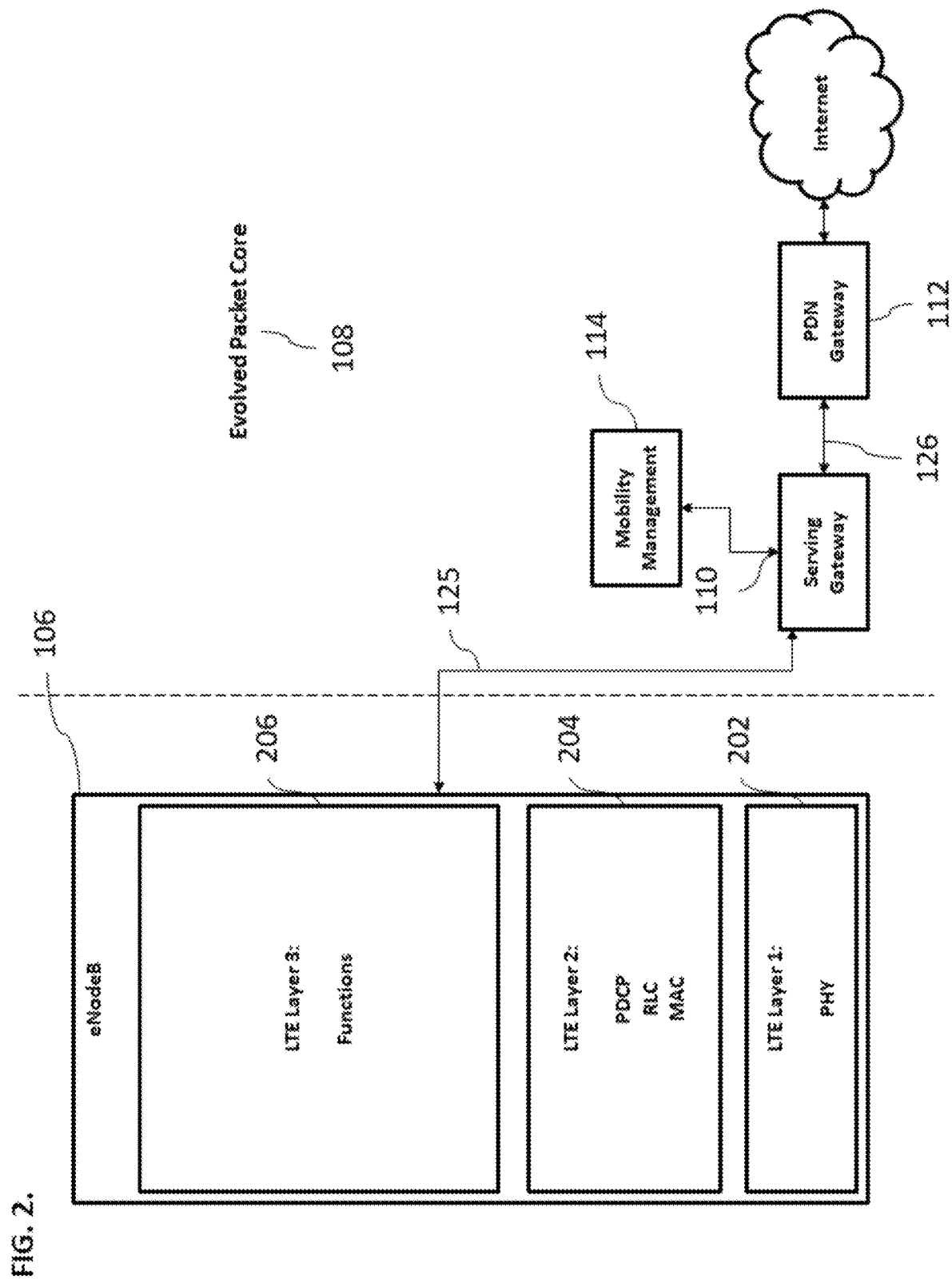
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
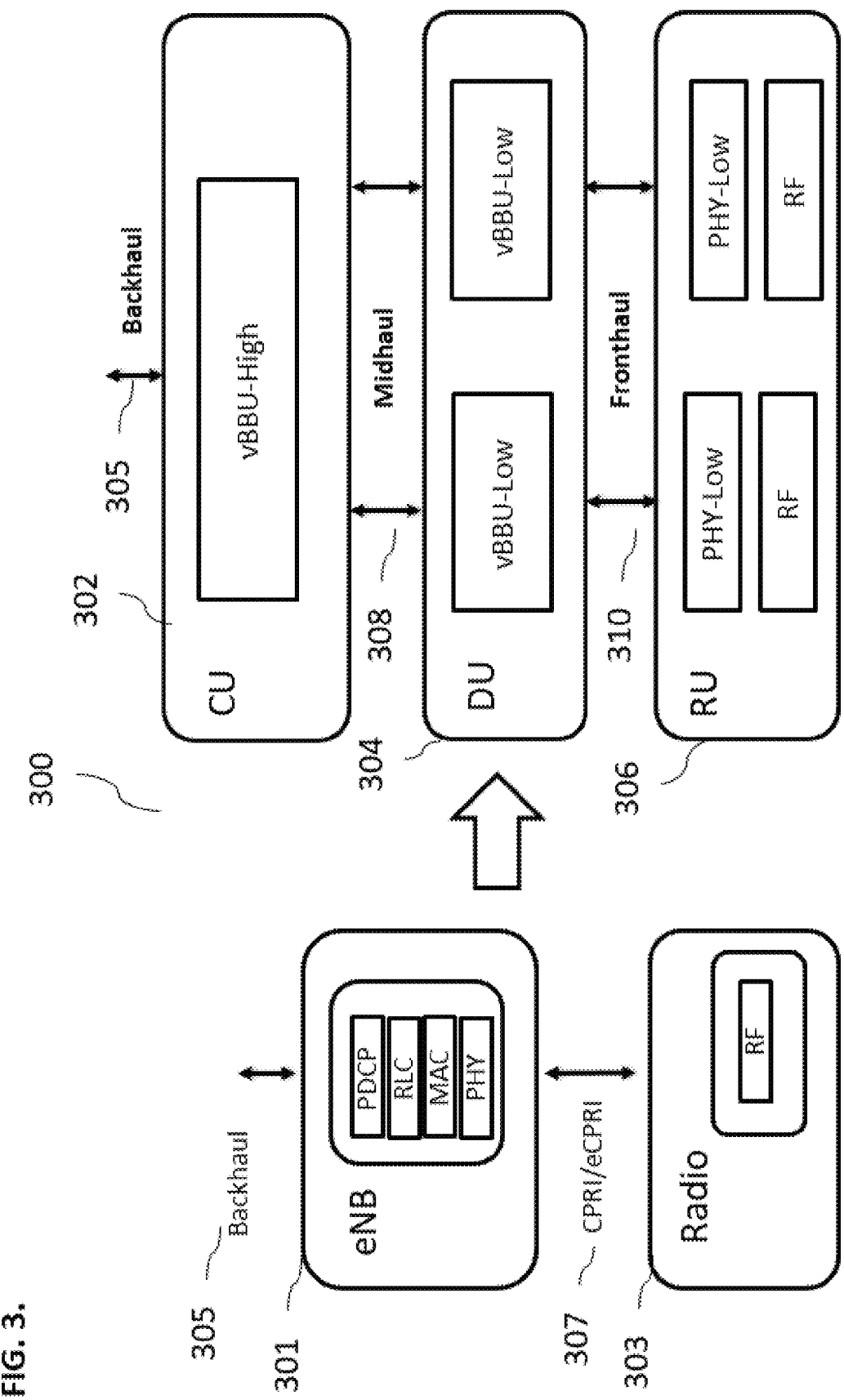
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
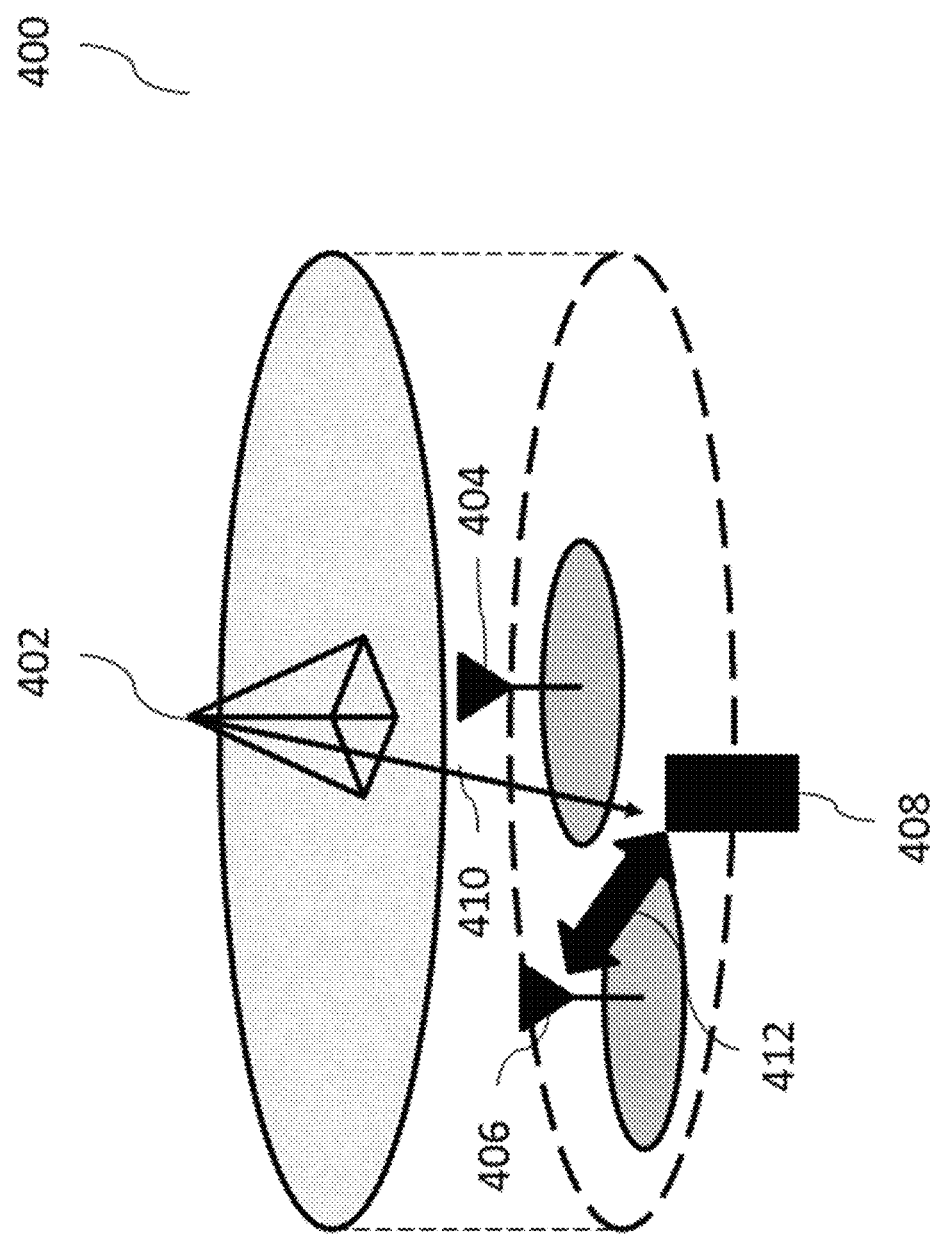
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
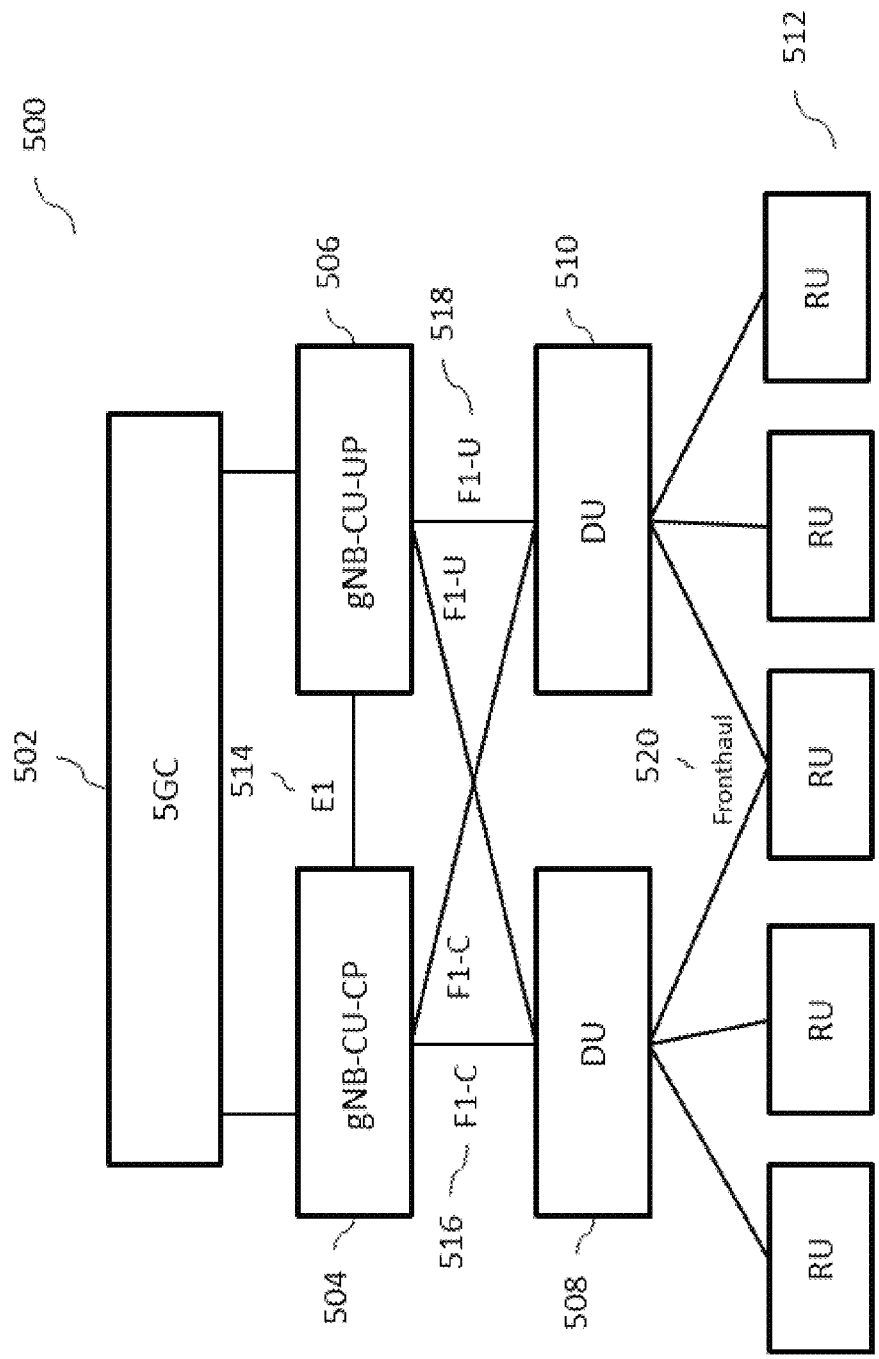
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
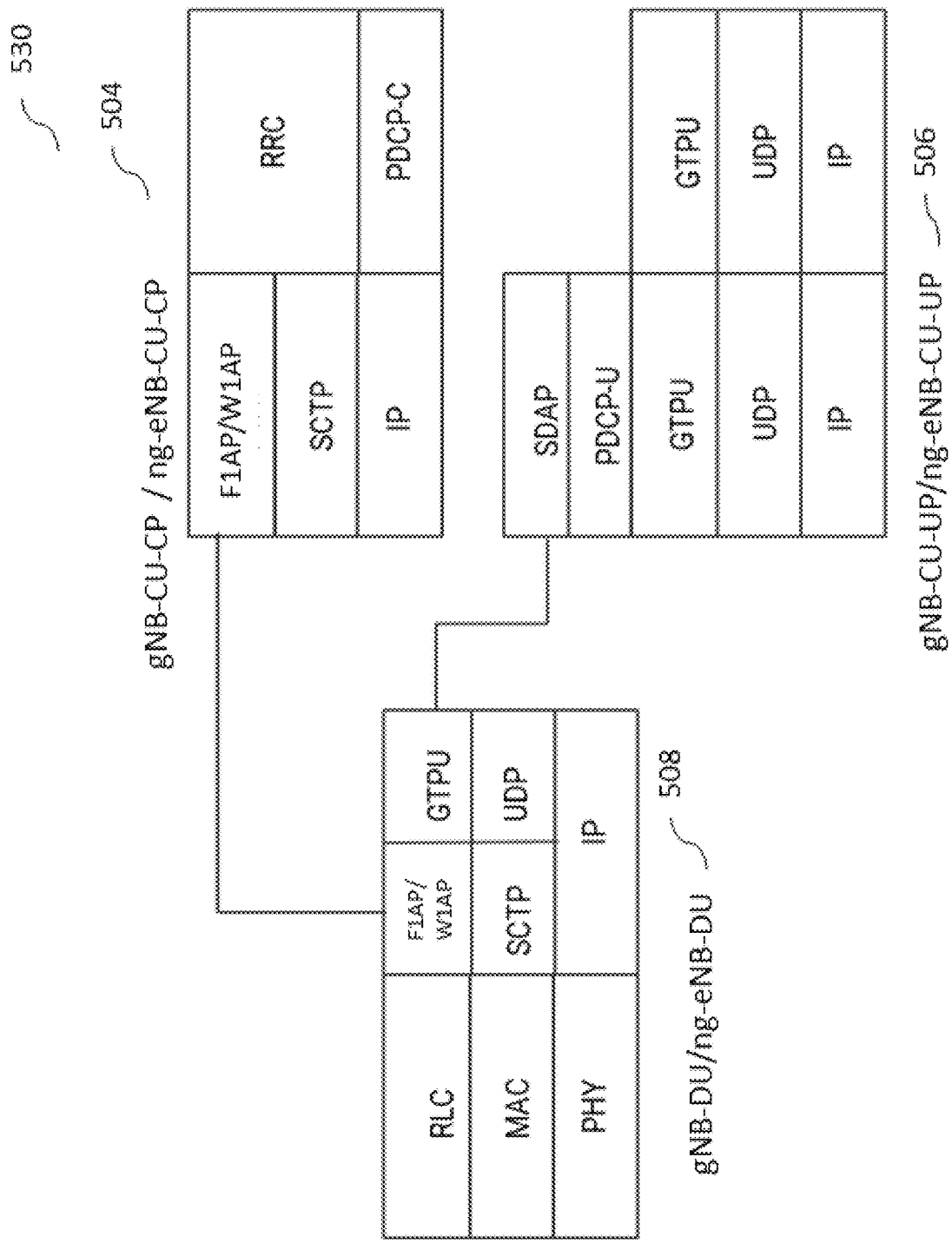
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP, and IP sublayers.

Figure 5C:
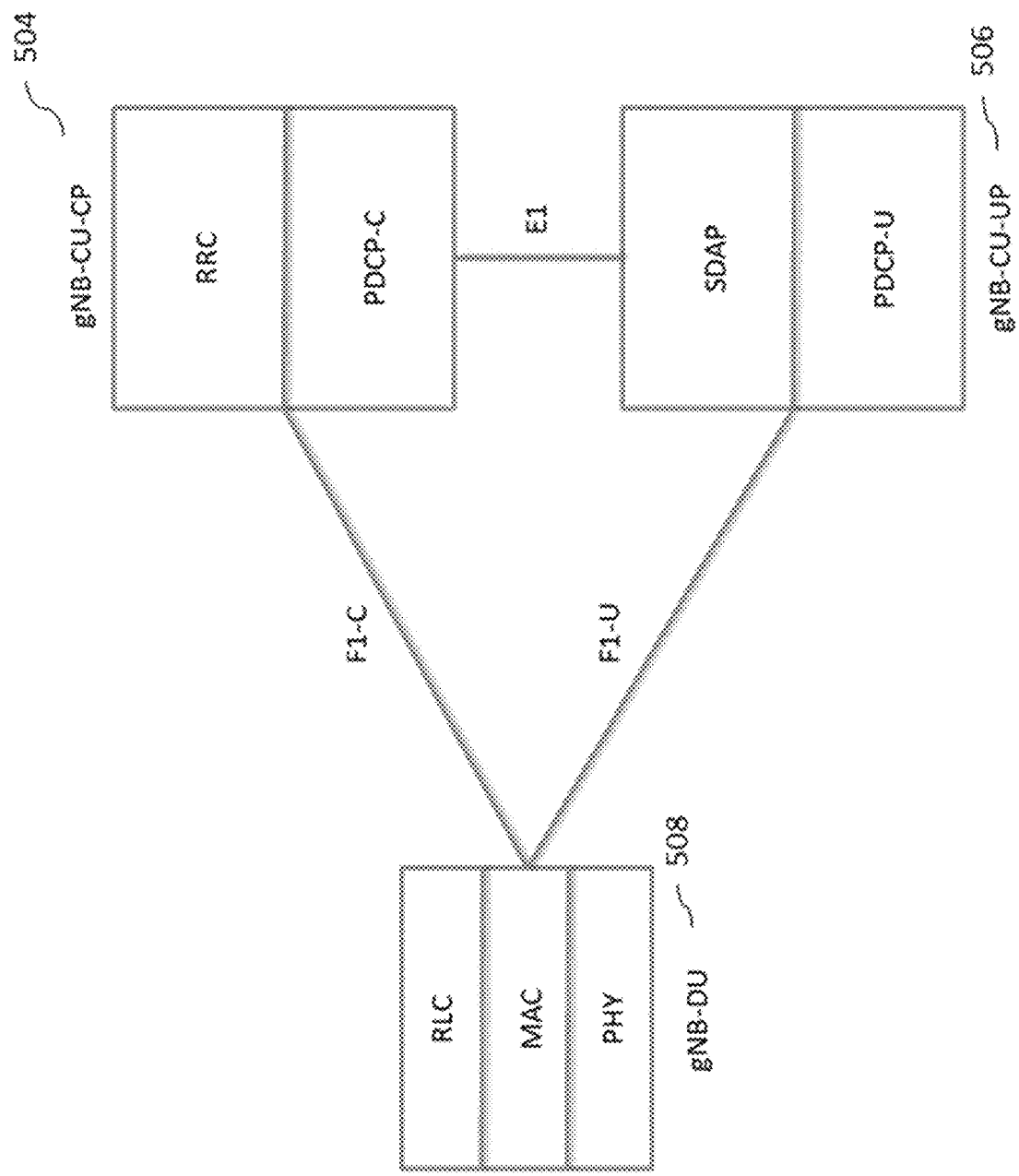
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and gNB-CU-UP 506 using an F1-C communication interface. The gNB-CU-CP 504 and gNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. LTM for Intra-Base Station Cu-Up Relocation

In some implementations of the current subject matter, a base station (e.g., the gNodeB of FIG. 5a, etc.) of a wireless communication system (e.g., a 5G wireless communication system, a 6G or later generation wireless communication system, etc.) can have a disaggregated architecture in which the base station includes more than one CU-UP (e.g., gNB-CU-UP 506 of FIGS. 5a-5c, etc.). The base station can be configured to provide LTM when a UE communicatively coupled to the base station undergoes relocation from one CU-UP of the base station to another CU-UP of the base station for one or more services.

Figure 6A:
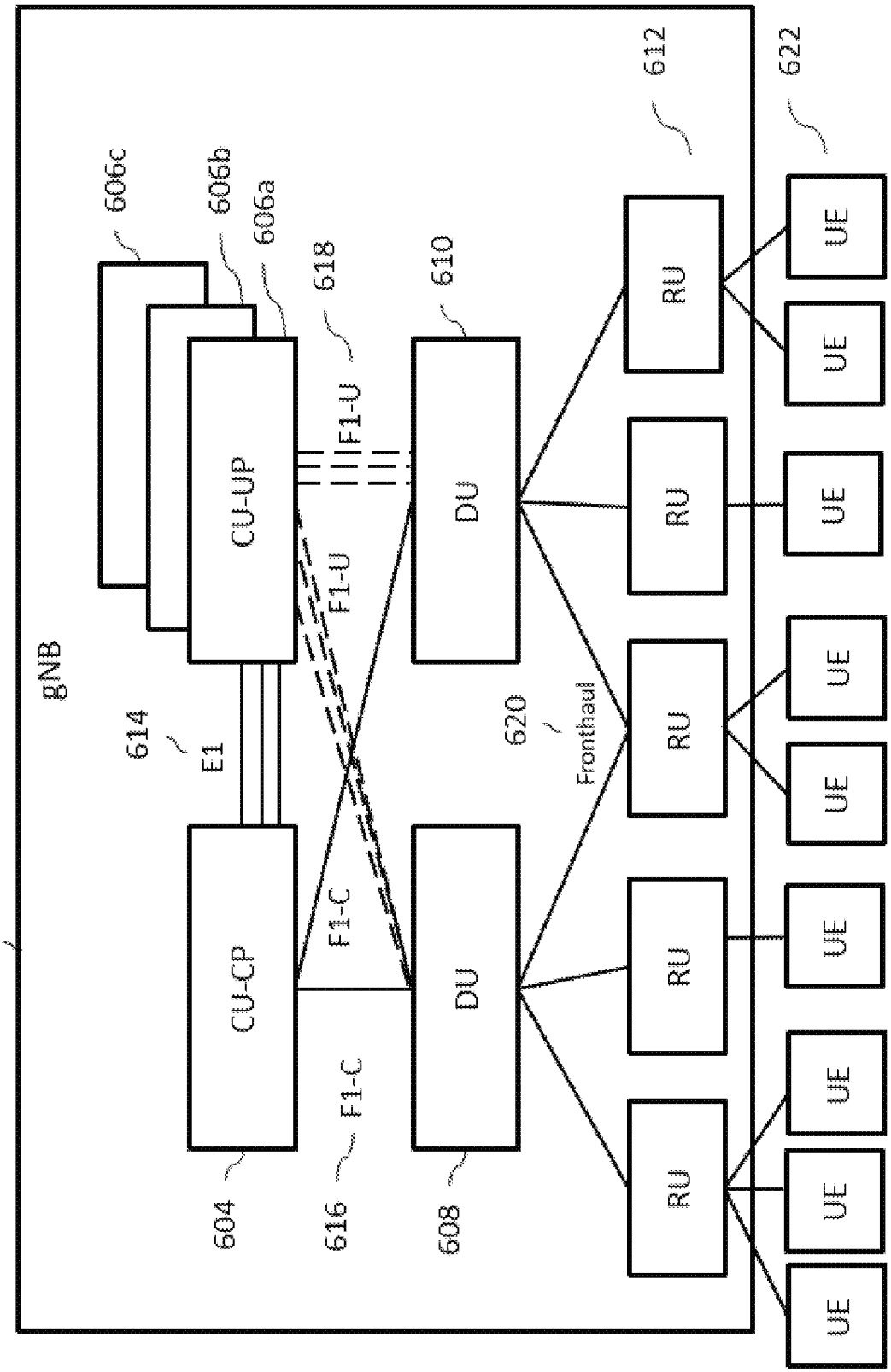
FIG. 6a illustrates an exemplary system, according to some implementations of the current subject matter.

FIG. 6a illustrates an exemplary system 600 configured to provide LTM for intra-base station CU-UP relocation. The base station 624 in this illustrated implementation is a gNB configured to be in a 5G wireless communication system similar to the 5G wireless communication system 500 of FIG. 5a discussed above, but other base stations can be similarly configured and used in providing LTM for intra-base station CU-UP relocation.

In the illustrated implementation of FIG. 6a, the base station 624 includes a plurality of CU-UPs 606a, 606b, 606c. The base station 624 includes three CU-UPs 606a, 606b, 606c in this illustrated implementation but can include another plural number of CU-UPs. The CU of the base station 624 that includes the plurality of CU-UPs 606a, 606b, 606c is configured to be communicatively coupled with a core network (not shown in FIG. 6a), e.g., the 5GC 502 of FIG. 5a, etc.

The CU of the base station 624 also includes a CU-CP 604 configured to be communicatively coupled to the CU's user plane portion 606a, 606b, 606c using an E1 communication interface 614. The E1 interface 614 includes three communication links in this illustrated implementation to reflect that there are three CU-UPs 606a, 606b, 606c with which the CU-CP 604 can be configured to communicate.

The base station 624 also includes a plurality of DUs 608, 610. The base station 624 includes two DUs 608, 610 in this illustrated implementation but can include another plural number of DUs. The CU-CP 604 is configured to be communicatively coupled to the DUs 608, 610 using F1-C communication interfaces 616. The CU-UPs 606a, 606b, 606c are configured to be communicatively coupled to the DUs 608, 610 using F1-U communication interfaces 618. The F1-U interface 618 associated with each of the DUs 608, 610 includes three communication links in this illustrated implementation to reflect that there are three CU-UPs 606a, 606b, 606c with which each DU 608, 610 can be configured to communicate.

The base station 624 also includes a plurality of RUs 612. The base station 624 includes five RUs 612 in this illustrated implementation but can include another plural number of RUs. The RUs 612 are configured to be communicatively coupled to the DUS 608, 610 via a fronthaul network 620. Additionally, each of the RUs 612 is configured to be communicatively coupled to one or more UEs 622. In this illustrated implementation, two of the RUs 612 are shown communicatively coupled to one UE 622, two of the RUs 612 are shown communicatively coupled to two UEs 622, and one of the RUs 612 is shown communicatively coupled to three UEs 622, but each of the RUs 612 can be coupled to another number of UEs same or different from any of the other RUs 612.

Intra-base station CU-UP relocation can be configured to occur when one of the UEs 622 communicatively coupled with the base station 624 undergoes relocation from one of the CU-UPs 606a, 606b, 606c to another one of the CU-UPs 606a, 606b, 606c for one or more services. The one of the CU-UPs 606a, 606b, 606c currently providing service to the UE 622 is referred to as a "serving CU-UP" due to it currently providing service to the UE 622, e.g., currently serving the UE 622. The one of the CU-UPs 606a, 606b, 606c to which the UE's service is being moved in the relocation is referred to as a "target CU-UP" due to it being targeted to provide service to the UE 622.

An intra-base station CU-UP relocation scenario can occur, for example, when one of the UEs 622 is being served by a first one of the DUs 608 (via one of the RUs 612) that is being served by a first one of the CU-UPs 606a and is having at least one service moved to a second one of the DUs 612 (via the same one of the RUs 612 or a different one of the RUs 612) that is being served by a second one of the CU-UPs 606b. The DU 608 currently providing service to the UE 622 is referred to as a "serving DU" due to it currently providing service to the UE 622, e.g., currently serving the UE 622. The DU 610 to which the UE's service is being moved is referred to as a "target DU" due to it being targeted to provide service to the UE 622. Each of the CU-UPs 606a, 606b, 606c has a different security key used in securely communicating with a DU. Thus, the target DU 610 needs the security key of the second CU-UP 606b before the DU 610 can provide service to the UE 622.

Intra-base station CU-UP relocation would not need to occur in a scenario, for example, where one of the UEs 622 is being served by one of the first and second DUs 608, 610 that is being served by one of the CU-UPs 606a, 606b, 606c and is having at least one service moved to the other one of the DUs 608, 610 that is also served by that same one of the CU-UPs 606a, 606b, 606c. Therefore, one of the DUs 608, 610 providing service to the UE 622 may be changing, but the CU-UP 606a, 606b, 606c providing service to the UE 622 is not changing.

Figure 6B:
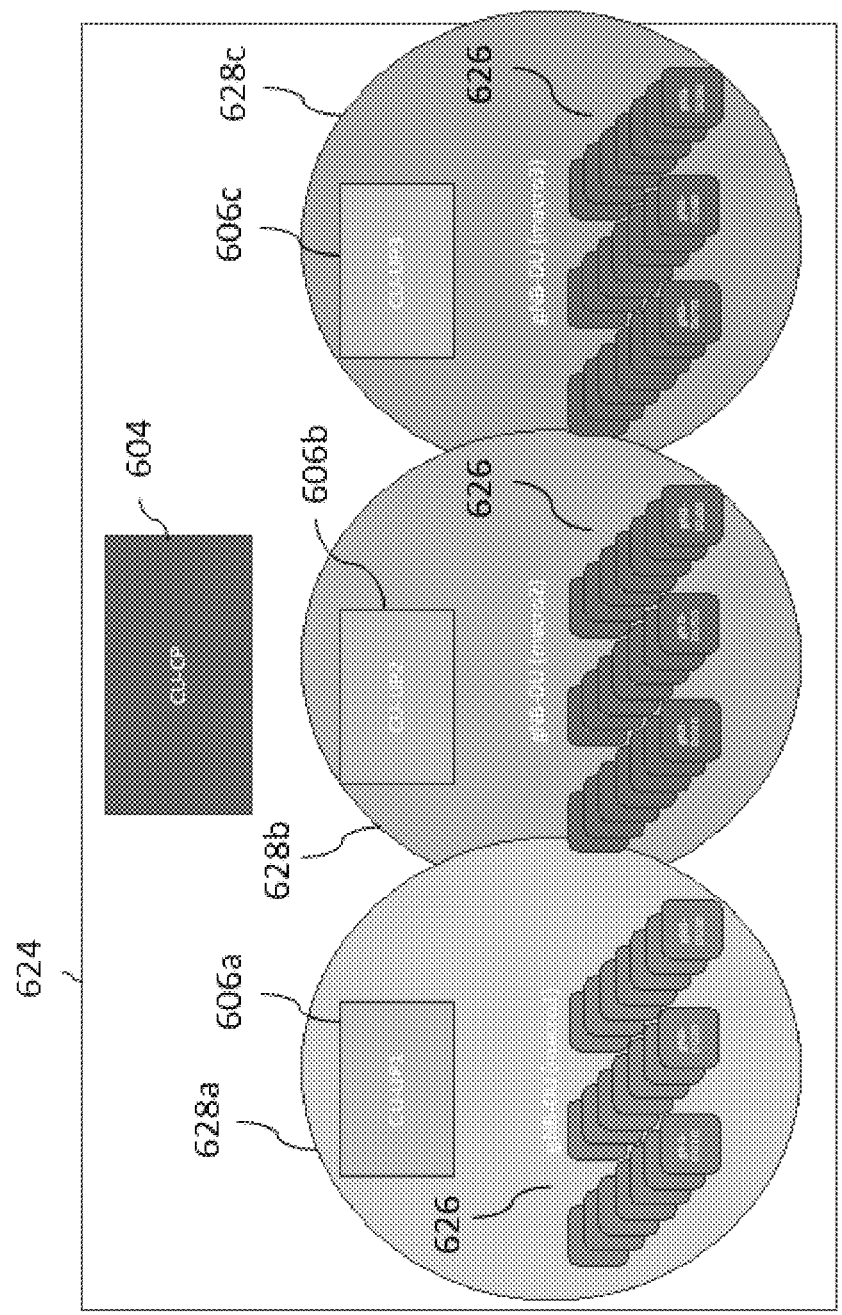
FIG. 6b illustrates an exemplary alternate configuration of the system of FIG. 6a, according to some implementations of the current subject matter.

Scenarios in which intra-base station CU-UP relocation is configured to occur or to not occur are further described with respect to FIG. 6b. FIG. 6b illustrates the CU-CP 604 and the CU-UPs 606a, 606b, 606b of FIG. 6a, but in the illustrated implementation of FIG. 6b, the base station 624 includes more than two DUs. In the illustrated implementation of FIG. 6b, the base station 624 includes sixty-six DUs 626, 628. Three of the DUs 628a, 628b, 628c are macro cells (labeled macro1, macro2, and macro3 in FIG. 6b), and sixty-three of the DUs 626 small cells (nine of which are labeled in FIG. 6b as gNB-DU10, gNB-DU20, gNB-DU30, gNB-DU40, gNB-DU50, gNB-DU60, gNB-DU70, gNB-DU80, and gNB-DU90). The base station 624 can include another number of macro cells and/or another number of small cells. The macro1 DU 628a, the macro2 DU 628b, and twenty-one of the small cell DUs 626 including gNB-DU10, gNB-DU20, and gNB-DU30 are configured to be served by the first CU-UP 606a (labeled CU-UP1 in FIG. 6b). The macro1 DU 628a, macro2 DU 628b, macro3 DU 628c, and twenty-one of the small cell DUs 626 including gNB-DU40, gNB-DU50, and gNB-DU60 are configured to be served by the second CU-UP 606b (labeled CU-UP2 in FIG. 6b). The macro2 DU 628b, macro3 DU 628c, and twenty-one of the small cell DUs 626 including gNB-DU70, gNB-DU80, and gNB-DU90 are configured to be served by the third CU-UP 606c (labeled CU-UP3 in FIG. 6b).

One example of a scenario in which intra-base station CU-UP relocation is not configured to occur is at least one service of a UE moving from one macro cell being served by a particular CU-UP to another macro cell also being served by that CU-UP, e.g., moving from the macro1 DU 628a being served by the first CU-UP 606a to the macro2 DU 628b also being served by the first CU-UP 606a, moving from the macro3 DU 628c being served by the second CU-UP 606b to the macro2 DU 628b also being served by the second CU-UP 606b, etc. Another example of a scenario in which intra-base station CU-UP relocation is not configured to occur is at least one service of one of the UEs 622 moving from one small cell being served by a particular CU-UP to another small cell also being served by that CU-UP, e.g., moving from gNB-DU10 626 to gNB-DU20 626, moving from gNB-DU50 626 to gNB-DU40 626, moving from gNB-DU50 626 to gNB-DU60 626, moving from gNB-DU70 626 to gNB-DU80 626, moving from gNB-DU80 626 to gNB-DU70 626, etc.

One example of a scenario in which intra-base station CU-UP relocation is configured occur is at least one service of one of a UE moving from one macro cell being served by a particular CU-UP to another macro cell being served by another CU-UP, e.g., moving from the macro1 DU 628a being served by the first CU-UP 606a to the macro3 DU 628c being served by the second CU-UP 606b, moving from the macro3 DU 628a being served by the second CU-UP 606a to the macro3 DU 628c being served by the third CU-UP 606c, etc. Another example of a scenario in which intra-base station CU-UP relocation is configured to occur is at least one service of one of a UE moving from one small cell being served by a particular CU-UP to a small cell being served by another CU-UP, e.g., moving from gNB-DU10 626 being served by the first CU-UP 606a to gNB-DU40 626 being served by the second CU-UP 606b, moving from gNB-DU80 626 being served by the third CU-UP 606b to gNB-DU40 626 being served by the second CU-UP 606b, moving from gNB-DU90 626 being served by the third CU-UP 606c to gNB-DU30 626 being served by the first CU-UP 606a, moving from gNB-DU50 626 being served by the second CU-UP 606b to gNB-DU20 626 being served by the first CU-UP 606a, etc.

In the implementation shown in FIG. 6b, each CU-UP 606a, 606b, 606c is serving a subset of DUs 626, 628a, 628, 628c for all the services. However, a CU-UP can serve all the DUs of the base station for one service (e.g., enhanced mobile broadband (eMBB)), while serving a subset of the DUs for another service (e.g., vehicle-to-everything (V2X) or ultra-reliable low latency communication (URLLC)).

The scenarios discussed above with respect to FIGS. 6a and 6b demonstrate examples of intra-base station CU-UP relocation. The intra-base station CU-UP relocation described herein similarly applies to L1/L2 based inter-cell mobility covering an intra-CU inter-DU scenario. One example of such a scenario is at least one service of one of a UE moving from one small cell being served by a particular CU-UP to another small cell being served by that CU-UP, e.g., moving from gNB-DU10 626 being served by the first CU-UP 606a to gNB-DU20 626 being served by the first CU-UP 606a, moving from gNB-DU40 626 being served by the second CU-UP 606b to gNB-DU60 626 being served by the second CU-UP 606b, moving from gNB-DU90 626 being served by the third CU-UP 606c to gNB-DU80 626 being served by the third CU-UP 606c, etc.

In some implementations, providing LTM for intra-base station CU-UP relocation can include a preparation stage and a data forwarding stage that occurs after the preparation stage. In some implementations, the preparation stage can include a CU-CP (e.g., gNB-CU-CP 504 of FIGS. 5a-5c, CU-CP 604 of FIGS. 6*a* and 6*b*, etc.) of a base station (e.g., gNodeB of FIG. 5*a*, gNB 624 of FIGS. 6*a* and 6*b*, etc.) preparing a target DU (e.g., DU 508 of FIGS. 5*a*-5*c*, DU 510 of FIG. 5*a*, DU 608 of FIG. 6*a*, DU 610 of FIG. 6*a*, DUs 626 of FIG. 6*b*, DUs 628 of FIG. 6*b*, etc.) and a target CU-UP (e.g., gNB-CU-UP 506 of FIGS. 5*a*-5*c*, CU-UPs 606*a*, 606*b*, 606*c* of FIGS. 6*a* and 6*b*, etc.) for LTM.

The preparation of the target DU can include the CU-CP providing a security key of a UE provided by a target CU-UP to the target DU, thereby allowing the target DU to securely communicate with the UE and the target CU-UP using the security key. The CU-CP can provide the security key to the target DU before the serving cell change is performed and at least one service for a UE (e.g., UEs 622 of FIG. 6*a*, etc.) has been relocated to the target CU-UP, so the target DU can securely communicate with the UE and the target CU-UP without delay once the serving cell change has occurred. In some implementations, the CU-CP can be configured to provide the security key to the target DU in a F1: UE CONTEXT SETUP REQUEST message. The F1: UE CONTEXT SETUP REQUEST message is defined by 3GPP. The security key may thus be transmitted from the CU-CP to the target DU using a message already transmitted from the CU-CP to the target DU in accordance with 3GPP standards.

The preparation of the target CU-UP can include the CU-CP providing notification to the target CU-UP that relocation will be occurring for a given UE. The notification can allow the CU-CP to receive the target CU-UP's security key for the UE from the target CU-UP, e.g., in reply to the notification, so that the CU-CP can provide the security key to the target DU during LTM target cell preparation. In some implementations, the CU-CP can be configured to provide the notification to the target CU-UP in a BEARER CONTEXT SETUP REQUEST message, such as in an Information Element (IE) of the BEARER CONTEXT SETUP REQUEST message. The BEARER CONTEXT SETUP REQUEST message is defined by 3GPP. The notification may thus be transmitted from the CU-CP to the target CU-UP using a message already transmitted from the CU-CP to the target CU-UP in accordance with 3GPP standards. The same message may also be used to reserve required resources for the UE's CU-UP relocation.

In some implementations, the data forwarding stage can include a serving DU (e.g., DU 508 of FIGS. 5*a*-5*c*, DU 510 of FIG. 5*a*, DU 608 of FIG. 6*a*, DU 610 of FIG. 6*a*, DUs 626 of FIG. 6*b*, DUs 628 of FIG. 6*b*, etc.) indicating to a serving CU-UP (e.g., gNB-CU-UP 506 of FIGS. 5*a*-5*c*, CU-UPs 606*a*, 606*b*, 606*c* of FIGS. 6*a* and 6*b*, etc.) when to initiate data forwarding to the target CU-UP. The data forwarding stage can also include the CU-CP identifying the target CU-UP for a given target cell to the serving DU, which can allow the serving DU to identify the target CU-UP corresponding to a target cell at a target DU to the serving CU-UP so the serving CU-UP can communicate with the target CU-UP for purposes of triggering data forwarding to the target CU-UP. In some implementations, the CU-CP can be configured to identify the target CU-UP for a given target cell to the serving DU in a UE CONTEXT MODIFICATION REQUEST message. The UE CONTEXT MODIFICATION REQUEST message is defined by 3GPP. The identification of the target CU-UP for a given target cell may thus be provided from the CU-CP to the serving DU using a message already transmitted from the CU-CP to the serving DU in accordance with 3GPP standards.

Figure 7:
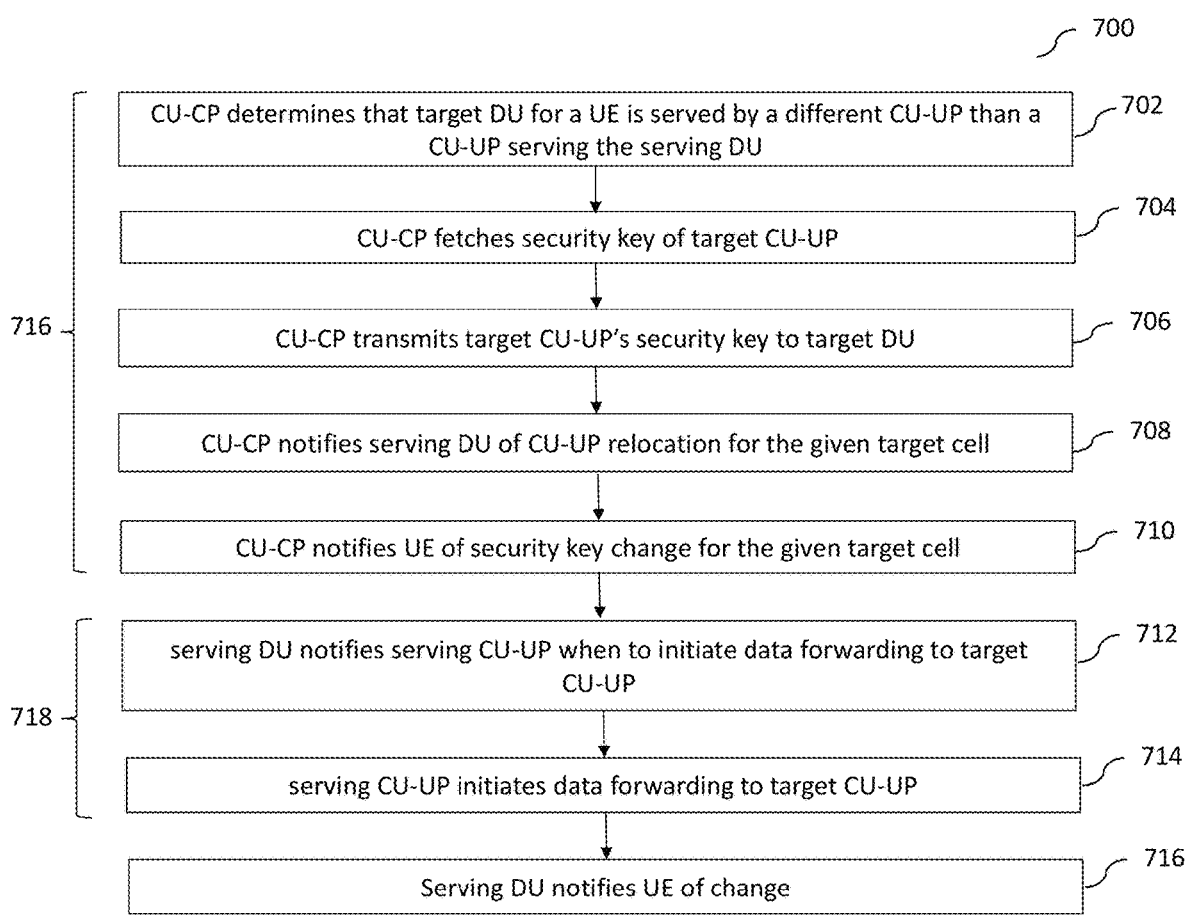
FIG. 7 illustrates an exemplary method, according to some implementations of the current subject matter.
Figure 8:
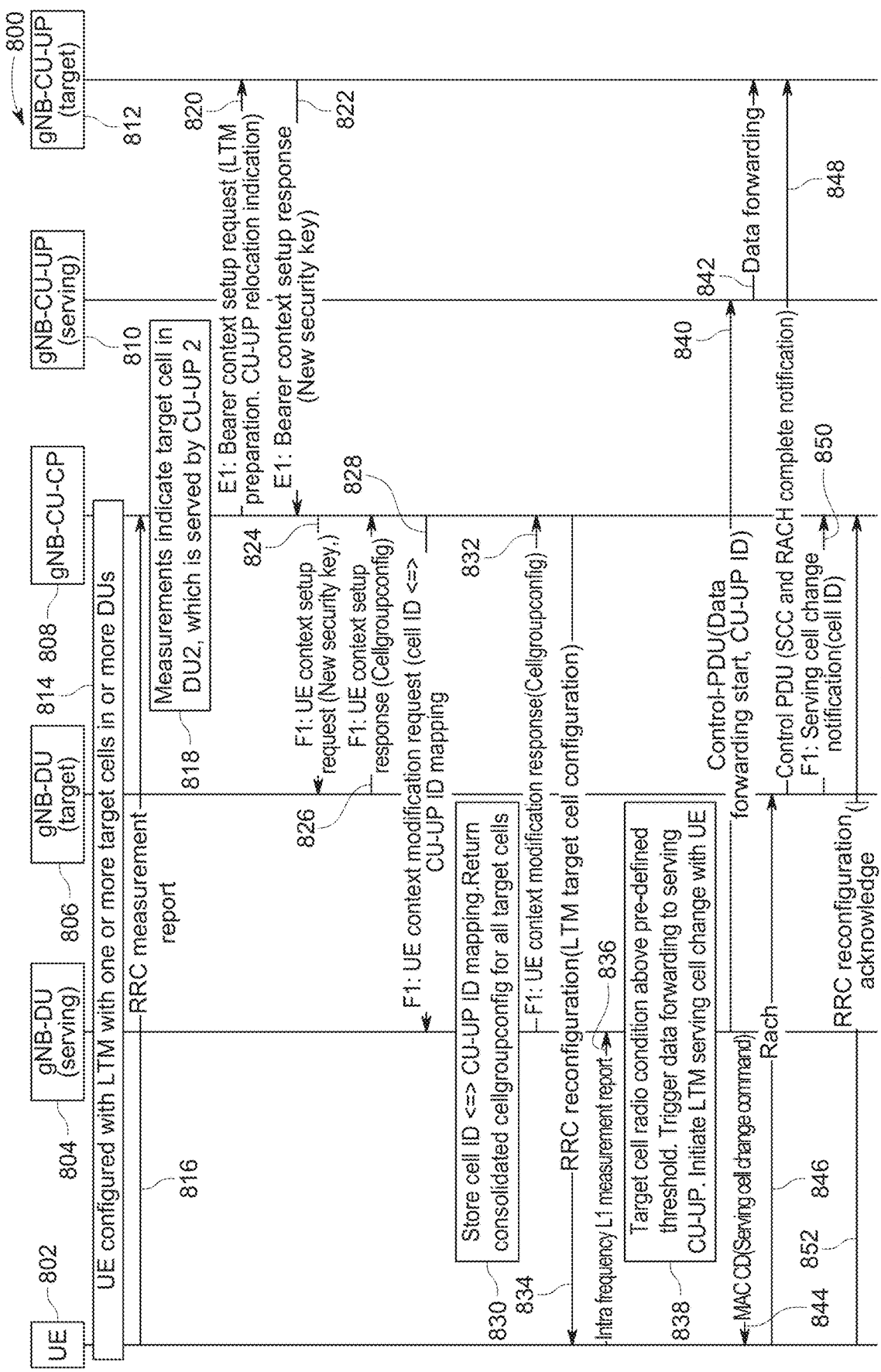
FIG. 8 illustrates another exemplary system, according to some implementations of the current subject matter.

FIG. 7 illustrates an exemplary method 700, according to some implementations of the current subject matter. As shown in FIG. 7, the method 700 includes a preparation stage 716 and a data forwarding stage 718. The method 700 is described with respect to an exemplary system 800 illustrated in FIG. 8 but can be implemented similarly with other systems, e.g., the systems of FIGS. 6*a* and 6*b*, etc. The system 800 of FIG. 8 is a 5G system, but as mentioned above, LTM for intra-base station CU-UP relocation as described herein can be performed with other types of wireless communications systems, such as 6G or later generation wireless communications systems.

In the system 800, a UE 802 (e.g., UE 622 of FIG. 6*a*, etc.) is configured 814 with LTM with one or more target cells in one or more DUs 804, 806 (e.g., DU 508 of FIGS. 5*a*-5*c*, DU 510 of FIG. 5*a*, DU 608 of FIG. 6*a*, DU 610 of FIG. 6*a*, DUs 626 of FIG. 6*b*, DUs 628 of FIG. 6*b*, etc.) of a base station, e.g., a gNodeB (e.g., gNodeB of FIG. 5*a*, gNodeB 624 of FIGS. 6*a* and 6*b*, etc.). For ease of explanation the system 800 is shown in FIG. 8 with one UE 802 communicatively coupled to the base station, with two DUs 804, 806, and with two CU-UPs 810, 812 (e.g., gNB-CU-UP 506 of FIGS. 5*a*-5*c*, CU-UPs 606*a*, 606*b*, 606*c* of FIGS. 6*a* and 6*b*, etc.) of the base station, but more than one UE can be communicatively coupled to the base station, the base station can include more than two DUs, and the base station can include more than two CU-UPs. The base station of the system 800 also includes a CU-CP 808 (e.g., gNB-CU-CP 504 of FIGS. 5*a*-5*c*, CU-CP 604 of FIGS. 6*a* and 6*b*, etc.) and a plurality of RUs (e.g., RUs 512 of FIG. 5*a*, RUs 612 of FIG. 6*a*, etc.) (not shown in FIG. 8). The UE 802 is currently being served by the serving DU 804 and by the serving CU-UP 810.

The method 700 includes the CU-CP 808 determining 702 that the target DU 806 for the UE 802 is served by a different CU-UP (the target CU-UP 812) than the serving CU-UP 810 that is currently serving the serving DU 804. The CU-CP's determination 702 can include the CU-CP 808 analyzing 818 a radio resource control (RRC) measurement report transmitted 816 by the UE 802, in accordance with 3GPP standards, to the CU-CP 808. In accordance with 3GPP standards, the RRC measurement report can include layer 3 (L3) measurements that can be analyzed by the CU-CP 808 in making resource control decisions, which can include a service change in which the UE 802 is to be served by a DU, e.g., the target DU 806, other than the serving DU 804 for at least one service. The CU-CP 808 is aware, per 3GPP standards, of the serving CU-UP 810 currently serving the serving DU 804 and of the CU-UP 812 currently serving the target DU 806. The CU-CP 808 is therefore aware that LTM for intra-base station CU-UP relocation is appropriately performed in this scenario since the CU-UP serving the UE 802 will be changed.

In response to determining 702 that the target DU 806 for the UE 802 is served by a different CU-UP (the target CU-UP 812) than the serving CU-UP 810 that is currently serving the serving DU 804, the CU-CP 808 prepares the target CU-UP 812 for LTM. The preparation of the target CU-UP 812 can include the CU-CP 808 requesting the target CU-UP 812 to reserve necessary resources for the UE 802 and fetching 704 a security key for the UE 802 from the target CU-UP 812. As shown in FIG. 8, preparing the target CU-UP 812 for LTM and fetching 704 the security key can include the CU-CP 808 transmitting 820 a E1: BEARER CONTEXT SETUP REQUEST message to the target CU-UP 812 using an E1 communication interface. As also shown in FIG. 8, the E1: BEARER CONTEXT SETUP REQUEST message can include an IE informing the target CU-UP 812 that CU-UP relocation will be occurring so the target CU-UP 812 can reserve resources for the UE 802.

In response to receiving the E1: BEARER CONTEXT SETUP REQUEST message, e.g., in response to receiving the IE indicating that CU-UP relocation will be occurring, the target CU-UP 812 transmits 822 a E1: BEARER CONTEXT SETUP RESPONSE message to the CU-CP 808 that includes the target CU-UP's security key for the UE 802. The E1: BEARER CONTEXT SETUP RESPONSE message is defined by 3GPP. The security key may thus be transmitted to the CU-CP 808 from the target CU-UP 812 using a message already transmitted to the CU-CP 808 from the target CU-UP 812 in accordance with 3GPP standards.

Having fetched 704 the target CU-UP's security key for the UE 802, the CU-CP 808 transmits 706 the security key for the UE 802 to the target DU 806 to prepare the target DU 806 for LTM. As shown in FIG. 8, the transmission 706 of the security key to the target DU 806 can include the CU-CP 808 transmitting 824, using an F1 communication interface, a UE CONTEXT SETUP REQUEST message that includes the target CU-UP's security key for the UE 802. In response to receiving the F1: UE CONTEXT SETUP REQUEST message, the target DU 806 reserves the necessary resources and transmits 826 a F1: UE CONTEXT SETUP RESPONSE message. As shown in FIG. 8, the F1: UE CONTEXT SETUP RESPONSE message can include cell group configuration information for the target DU 806. The F1: UE CONTEXT SETUP REQUEST message and the F1: UE CONTEXT SETUP RESPONSE message are each defined by 3GPP. The security key may thus be transmitted from the CU-CP 808 to the target DU 806, and be acknowledged by the target DU 806 to the CU-CP 808, using messages already transmitted in accordance with 3GPP standards.

The CU-CP 808 also notifies 708 the serving DU 804 of the change in CU-UP for a given target cell, by identifying the target CU-UP 812 and the corresponding target cell or target DU 806, to the serving DU 804. As shown in FIG. 8, the notification to the serving DU 804 can include the CU-CP 808 transmitting 828 a UE CONTEXT MODIFICATION REQUEST message to the serving DU 804 using an F1 communication interface. As also shown in FIG. 8, the UE CONTEXT MODIFICATION REQUEST message can include cell identification information and target CU-UP mapping information.

In response to receiving the UE CONTEXT MODIFICATION REQUEST message, the serving DU 804 stores 830 the received information identifying the target CU-UP 812 and transmits 832 a UE CONTEXT MODIFICATION RESPONSE message to the CU-CP 808. As shown in FIG. 8, the UE CONTEXT MODIFICATION RESPONSE message includes consolidated cell group configuration information for all the target cells identified to the UE 802 by the CU-CP 808. The UE CONTEXT MODIFICATION REQUEST message and the UE CONTEXT MODIFICATION RESPONSE message are each defined by 3GPP. The serving DU 804 can thus receive information regarding the target CU-UP 812 from the CU-CP, and acknowledge the receipt to the CU-CP 808, using messages already transmitted in accordance with 3GPP standards.

The CU-CP 808 also notifies 710 the UE 802 of the security key change corresponding to a target cell (indirectly, the CU-UP change). As shown in FIG. 8, this notification to the UE 802 can include the CU-CP 808 transmitting 834 an RRC reconfiguration message to the UE 802, in accordance with 3GPP standards. As also shown in FIG. 8, the RRC reconfiguration message includes target cell configuration information which includes the security key corresponding to the target cell, e.g., as provided to the CU-CP 808 from the target DU 806 in the UE CONTEXT SETUP RESPONSE message. The RRC reconfiguration message containing the target cell configuration information (LTM preparation) indicates to the UE 802 that the security key is different for the new target cell served by the target CU-UP 812. The PDCP (packet data convergence protocol) entity needs to be reset for this scenario.

In response to receiving the RRC reconfiguration message, the UE 802 transmits 836 an intra- or inter-frequency L1 measurement report to the serving DU 804, in accordance with 3GPP standards. The intra- or inter-frequency L1 measurement report provides the UE measured radio condition information to the serving DU 804 indicating when the serving DU 804 should trigger the serving CU-UP 810 to perform data forwarding to the target DU 806.

Thereafter, in accordance with the intra- or inter-frequency L1 measurement report that indicates a predefined threshold configured as criteria when the triggering should occur, the serving DU 804 triggers data forwarding from the serving CU-UP 810 to the target CU-UP 812 by notifying 712 the serving CU-UP 810 when to initiate data forwarding to the target CU-UP 812. As shown in FIG. 8, the serving DU 804 can notify 712 the serving CU-UP 810 by transmitting 840 a control packet data unit (PDU) to the serving CU-UP 810, in accordance with 3GPP standards. The control PDU is a user plane data packet that includes control plane information so is not a control signaling message. As also shown in FIG. 8, the control PDU includes information identifying the target CU-UP 812, e.g., by including an ID of the CU-UP 812 as provided to the serving DU 804 in the UE CONTEXT MODIFICATION REQUEST message, and information indicating that data forwarding to the target CU-UP 812 should begin.

In response to the serving CU-UP 810 being notified 712 by the serving DU 804 to start data forwarding, the serving CU-UP 810 initiates 714 data forwarding to the target CU-UP 812 by transmitting 842 unsent and unacknowledged data PDUs to the target CU-UP 812. The serving CU-UP 810 knows which CU-UP of the base station to contact as the target CU-UP 812 because of the CU-UP ID provided to the serving CU-UP 810 by the serving DU 804.

In some implementations, instead of the serving DU 804 transmitting 840 the control PDU to the serving CU-UP 810, the serving DU 804 can transmit a signaling message to the CU-CP 808 using an F1-C communication interface, then the CU-CP 808 initiates data forwarding to the target CU-UP 812 by transmitting a message to the serving CU-UP 810 using the E1 communication interface, and then the serving CU-UP 810 initiates data forwarding to the target CU-UP 812. This alternate implementation uses one more message transmission than the implementation illustrated in FIG. 8 but takes advantage of the E1-C communication interface in triggering data forwarding, unlike the implementation illustrated in FIG. 8.

Referring again to FIG. 7, after the serving DU 804 has triggered data forwarding, e.g., after the serving DU 804 transmits 840 the control PDU to the serving CU-UP 810 (or to the CU-CP 808 in the alternate implementation), the serving DU 804 notifies 716 the UE 802 of the serving cell change, e.g., that LTM secondary component carrier (SCC) has to be performed to the target DU 806 for the UE 802. As shown in FIG. 8, the UE notification 716 can include the serving DU 804 transmitting 844 a MAC control element (MAC CE) to the UE 802 that includes a serving cell change command. As also shown in FIG. 8, the MAC CE can include a security key change indication, which can be 1-bit indicator in the MAC CE.

In response to receiving the MAC CE, the UE 802 transmits 846 a random access channel (RACH) message, in accordance with 3GPP standards, to the target DU 812, and the UE 802 transmits 852 an RRC reconfiguration acknowledgment message to the CU-CP 808. In response to completion of a successful the RACH procedure, the target DU 812 transmits 848 a control PDU to the target CU-UP 812, and the target DU 812 transmits 850 a serving cell change notification message to the CU-CP 808 using the F1 communication interface. As shown in FIG. 8, the control PDU can include a SCC and RACH complete notification. This notification allows start of downlink data transmission to the UE 802. As also shown in FIG. 8, the serving cell change notification message can include the ID of the target DU 812.

The base station of FIG. 8 is communicatively coupled with a core network (not shown in FIG. 8). The method 700 can also include performing a PATH SWITCH procedure towards core network, which can be performed in accordance with 3GPP standards as in an intra-gNB CU-UP relocation scenario.

Figure 9:
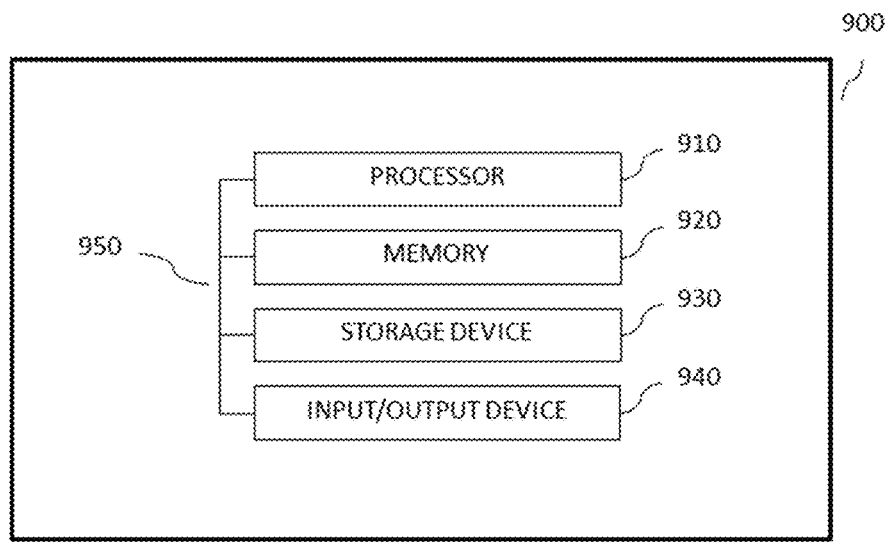
FIG. 9 illustrates yet another exemplary system, according to some implementations of the current subject matter.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930 and 940 can be interconnected using a system bus 950. The processor 910 can be configured to process instructions for execution within the system 600. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
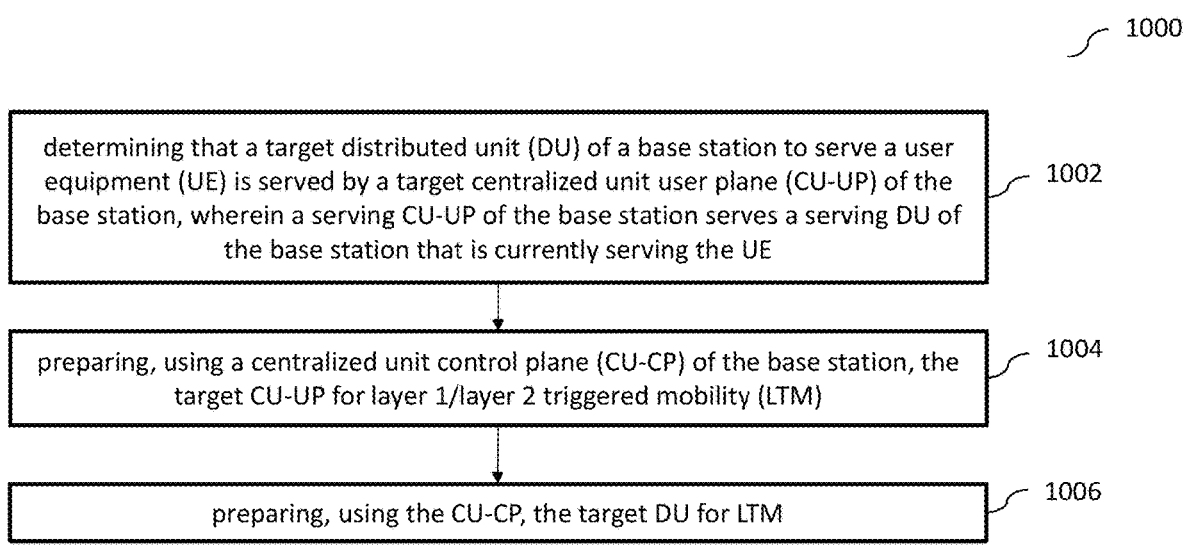
FIG. 10 illustrates another exemplary method, according to some implementations of the current subject matter.

FIG. 10 illustrates an exemplary method 1000 for LTM for intra-base station CU-UP relocation, according to some implementations of the current subject matter. The method 1000 may be performed, for example, using implementations shown in and described with respect to FIGS. 5a-8.

The method 1000 includes determining 1002 that a target distributed unit (e.g., DU 508 of FIGS. 5a-5c, DU 510 of FIG. 5a, DU 608 of FIG. 6a, DU 610 of FIG. 6a, DUs 626 of FIG. 6b, DUs 628 of FIG. 6b, target DU 806 of FIG. 8, etc.) of a base station (e.g., gNodeB of FIG. 5a, gNodeB 624 of FIG. 6a and 6b, gNodeB of FIG. 8, etc.) to serve a user equipment (e.g., UEs 622 of FIG. 6a, UW 802 of FIG. 8, etc.) is served by a target centralized unit user plane (e.g., gNB-CU-UP 506 of FIGS. 5a-5c, CU-UPs 606a, 606b, 606c of FIGS. 6a and 6b, target CU-UP 812, etc.) of the base station. A serving CU-UP (e.g., gNB-CU-UP 506 of FIGS. 5a-5c, CU-UPs 606a, 606b, 606c of FIGS. 6a and 6b, serving CU-UP 810, etc.) of the base station serves a serving DU (e.g., DU 508 of FIGS. 5a-5c, DU 510 of FIG. 5a, DU 608 of FIG. 6a, DU 610 of FIG. 6a, DUs 626 of FIG. 6b, DUs 628 of FIG. 6b, serving DU 804 of FIG. 8, etc.) of the base station that is currently serving the UE. The method 1000 also includes preparing 1004, using a centralized unit control plane (e.g., gNB-CU-CP 504 of FIGS. 5a-5c, CU-CP 604 of FIGS. 6a and 6b, CU-CP 808, etc.) of the base station, the target CU-UP for LTM, and preparing 1006, using the CU-CP, the target DU for LTM.

In some implementations, the current subject matter can include one or more of the following optional features.

In some implementations, preparing the target CU-UP can include fetching, using the CU-CP, a security key from the target CU-UP, and preparing the target DU can include transmitting, from the CU-CP to the target DU, the security key. Further, the security key configured by the target CU-UP can be transmitted from the CU-CP to the target DU in a UE CONTEXT SETUP REQUEST message; and/or fetching the security key can include the CU-CP transmitting a BEARER CONTEXT SETUP REQUEST message to the target CU-UP, and the CU-UP transmitting a BEARER CONTEXT SETUP RESPONSE message to the CU-CP, and the BEARER CONTEXT SETUP RESPONSE message can include the security key, which can correspond to the UE served by the target CU-UP. Further, the BEARER CONTEXT SETUP REQUEST message can include an information element (IE) informing the target CU-UP of the LTM.

In some implementations, preparing the target CU-UP can include transmitting, from the CU-CP to the target CU-UP, an information element (IE) informing the target CU-UP of the LTM to reserve resources for the UE.

In some implementations, the method can also include, after the preparation of the target CU-UP and the preparation of the target DU, triggering the serving CU-UP to begin data forwarding to the target CU-UP. Further, the triggering can include transmitting a control packet data unit (PDU) from the serving DU to the serving CU-UP to initiate downlink data transmission and, thereafter, the serving CU-UP transmitting unsent and unacknowledged data PDUs to the target CU-UP. Further, the method can also include, prior to the transmission of the control PDU to trigger data forwarding, transmitting, from the CU-CP to the serving DU, information to identify change of the serving CU-UP for LTM. Further, the information can be transmitted from the CU-CP to the serving DU in a UE CONTEXT MODIFICATION REQUEST message.

In some implementations, the method can also include, after the preparation of the target CU-UP and the preparation of the target DU, triggering the target CU-UP to begin serving the UE via the target DU. Further, the triggering can include transmitting a control packet data unit (PDU) from the target DU to the target CU-UP and, thereafter, the target CU-UP transmitting data PDUs to the target DU: or the triggering can include transmitting a first message from the serving DU to the CU-CP and, thereafter, the CU-CP transmitting a second message to the serving CU-UP and, thereafter, the serving CU-UP transmitting a third message to the target CU-UP: and/or serving the UE can include transmitting a first message from the target DU to the CU-CP and, thereafter, the CU-CP transmitting a second message to the target CU-UP and, thereafter, the target CU-UP initiating downlink data transmission towards the target DU.

In some implementations, the determining can include analyzing, using the CU-CP, a radio resource control (RRC) measurement report received at the CU-CP from the UE.

In some implementations, the serving CU-UP and the target CU-UP can be different entities.

In some implementations, the base station can be a new generation radio access network (NG-RAN) node (e.g., a gNodeB).

In some implementations, the base station can include the at least one processor and the at least one non-transitory storage media.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback: and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. An apparatus, comprising:
   at least one processor, and
   at least one non-transitory storage media storing instructions that, when executed by the at least one processor, cause the at least one processor to perform operations comprising:
      determining that a target distributed unit (DU) of a base station to serve a user equipment (UE) is served by a target centralized unit user plane (CU-UP) of the base station, wherein a serving CU-UP of the base station serves a serving DU of the base station that is currently serving the UE;
      preparing, using a centralized unit control plane (CU-CP) of the base station, the target CU-UP for layer 1/layer 2 triggered mobility (LTM); and
      preparing, using the CU-CP, the target DU for LTM, wherein preparing the target CU-UP includes fetching, using the CU-CP, a security key from the target CU-UP.

2. The apparatus of claim 1, wherein preparing the target DU includes transmitting, from the CU-CP to the target DU, the security key.

3. The apparatus of claim 2, wherein the security key configured by the target CU-UP is transmitted from the CU-CP to the target DU in a UE CONTEXT SETUP REQUEST message.

4. The apparatus of claim 2, wherein fetching the security key comprises the CU-CP transmitting a BEARER CONTEXT SETUP REQUEST message to the target CU-UP, and the CU-UP transmitting a BEARER CONTEXT SETUP RESPONSE message to the CU-CP; and
   the BEARER CONTEXT SETUP RESPONSE message includes the security key, which corresponds to the UE served by the target CU-UP.

5. The apparatus of claim 4, wherein the BEARER CONTEXT SETUP REQUEST message includes an information element (IE) informing the target CU-UP of the LTM.

6. The apparatus of claim 1, wherein preparing the target CU-UP includes transmitting, from the CU-CP to the target CU-UP, an information element (IE) informing the target CU-UP of the LTM to reserve resources for the UE.

7. The apparatus of claim 1, wherein the operations further comprise, after the preparation of the target CU-UP and the preparation of the target DU, triggering the serving CU-UP to begin data forwarding to the target CU-UP.

8. The apparatus of claim 7, wherein the triggering includes transmitting a control packet data unit (PDU) from the serving DU to the serving CU-UP and, thereafter, the serving CU-UP transmitting unsent and unacknowledged data PDUs to the target CU-UP.

9. The apparatus of claim 1, wherein the operations further comprise, after the preparation of the target CU-UP and the preparation of the target DU, triggering the target CU-UP to begin serving the UE via the target DU.

10. The apparatus of claim 9, wherein the triggering includes transmitting a control packet data unit (PDU) from the target DU to the target CU-UP to initiate downlink data transmission and, thereafter, the target CU-UP transmitting data PDUs to the target DU.

11. The apparatus of claim 8, wherein the operations further comprise, prior to the transmission of the control PDU to trigger data forwarding, transmitting, from the CU-CP to the serving DU, information to identify change of the serving CU-UP for LTM.

12. The apparatus of claim 11, wherein the information is transmitted from the CU-CP to the serving DU in a UE-CONTEXT MODIFICATION REQUEST message.

13. The apparatus of claim 9, wherein the triggering includes transmitting a first message from the serving DU to the CU-CP and, thereafter, the CU-CP transmitting a second message to the serving CU-UP and, thereafter, the serving CU-UP transmitting a third message to the target CU-UP.

14. The apparatus of claim 9, wherein serving the UE includes transmitting a first message from the target DU to the CU-CP and, thereafter, the CU-CP transmitting a second message to the target CU-UP and, thereafter, the target CU-UP initiating downlink data transmission towards the target DU.

15. The apparatus of claim 1, wherein the determining comprises analyzing, using the CU-CP, a radio resource control (RRC) measurement report received at the CU-CP from the UE.

16. The apparatus of claim 1, wherein the serving CU-UP and the target CU-UP are different entities.

17. The apparatus of claim 1, wherein the base station is a new generation radio access network (NG-RAN) node.

18. The apparatus of claim 1, wherein the base station includes the at least one processor and the at least one non-transitory storage media.

19. A computer-implemented method, comprising:
   determining that a target distributed unit (DU) of a base station to serve a user equipment (UE) is served by a target centralized unit user plane (CU-UP) of the base station, wherein a serving CU-UP of the base station serves a serving DU of the base station that is currently serving the UE;
   preparing, using a centralized unit control plane (CU-CP) of the base station, the target CU-UP for layer 1/layer 2 triggered mobility (LTM); and
   preparing, using the CU-CP, the target DU for LTM, wherein preparing the target CU-UP includes fetching, using the CU-CP, a security key from the target CU-UP.

20. At least one non-transitory storage media storing instructions that, when executed by at least one processor, cause the at least one processor to perform operations comprising:
   determining that a target distributed unit (DU) of a base station to serve a user equipment (UE) is served by a target centralized unit user plane (CU-UP) of the base station, wherein a serving CU-UP of the base station serves a serving DU of the base station that is currently serving the UE;
   preparing, using a centralized unit control plane (CU-CP) of the base station, the target CU-UP for layer 1/layer 2 triggered mobility (LTM); and
   preparing, using the CU-CP, the target DU for LTM, wherein preparing the target CU-UP includes fetching, using the CU-CP, a security key from the target CU-UP.

* * * * *